US010170006B2

(12) United States Patent
Kline et al.

(10) Patent No.: US 10,170,006 B2
(45) Date of Patent: Jan. 1, 2019

(54) ROUTE PLANNING FOR MULTI-UNMANNED AERIAL VEHICLE-BASED PACKAGE DELIVERY

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 73 days.

(21) Appl. No.: 15/277,078

(22) Filed: Sep. 27, 2016

(65) Prior Publication Data

US 2018/0090014 A1    Mar. 29, 2018

(51) Int. Cl.
| G08G 5/00 | (2006.01) |
| G01C 21/00 | (2006.01) |
| G05D 1/10 | (2006.01) |
| G06Q 10/04 | (2012.01) |
| G06Q 10/08 | (2012.01) |

(52) U.S. Cl.
CPC .......... *G08G 5/0034* (2013.01); *G05D 1/102* (2013.01); *G05D 1/104* (2013.01); *G06Q 10/047* (2013.01); *G06Q 10/083* (2013.01); *G08G 5/0013* (2013.01); *G08G 5/0026* (2013.01); *G08G 5/0039* (2013.01); *G08G 5/0043* (2013.01); *G08G 5/0069* (2013.01); *G08G 5/0091* (2013.01); *B64C 2201/128* (2013.01)

(58) Field of Classification Search
None
See application file for complete search history.

(56) References Cited

U.S. PATENT DOCUMENTS

| 8,165,809 | B1* | 4/2012 | Baker ................... G01C 21/00 701/533 |
| 8,989,922 | B2 | 3/2015 | Jones et al. |
| 2002/0120475 | A1 | 8/2002 | Morimoto |
| 2008/0005275 | A1 | 1/2008 | Overton et al. |
| 2014/0108556 | A1 | 4/2014 | Abhyanker |
| 2014/0164126 | A1 | 6/2014 | Nicholas et al. |
| 2015/0154557 | A1* | 6/2015 | Skaaksrud ............ H04W 12/06 705/337 |

(Continued)

OTHER PUBLICATIONS

Disclosed Anonymously, "Method and System for Predicting and Recommending Drone Travel Routes Based on Historical Data and Real Time Data Feeds," IP.com No. IPCOM000241624D, May 2015, 4 pages.

(Continued)

*Primary Examiner* — Adam D Tissot
(74) *Attorney, Agent, or Firm* — Cantor Colburn LLP

(57) ABSTRACT

An aspect includes receiving data for each of a plurality of unmanned aerial vehicles (UAVs) that includes a current location and final destination of each UAV. An aspect also includes calculating permutations of travel routes for each of the UAVs, which permutations are calculated as a function of the current locations of the UAVs and final destinations of each UAV. An aspect also includes applying a selected variable to the calculated permutations to produce proposed travel routes for the UAVs. An aspect further includes generating a routing plan from the proposed travel routes.

16 Claims, 4 Drawing Sheets

(56) References Cited

U.S. PATENT DOCUMENTS

2015/0339933 A1* 11/2015 Batla .................. G08G 5/0069
701/120

OTHER PUBLICATIONS

Ghanadan, R., Gu, J., & Shu, J. et al., "An Efficient Intranet Networking Solution for Aireborn Networks", IEEE Military Communications Conference, 2006, pp. 1-7.

* cited by examiner

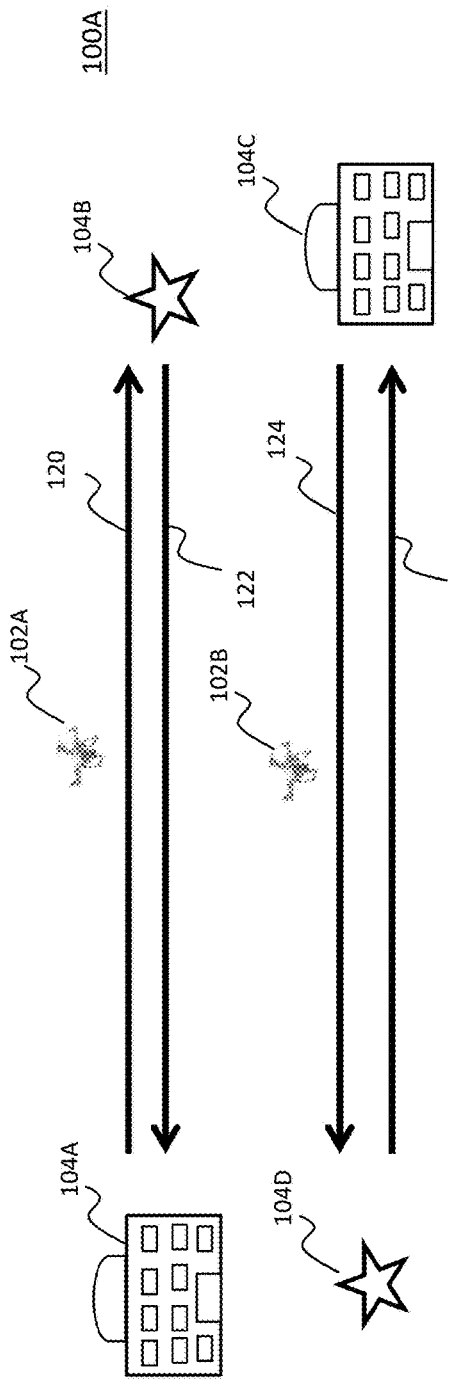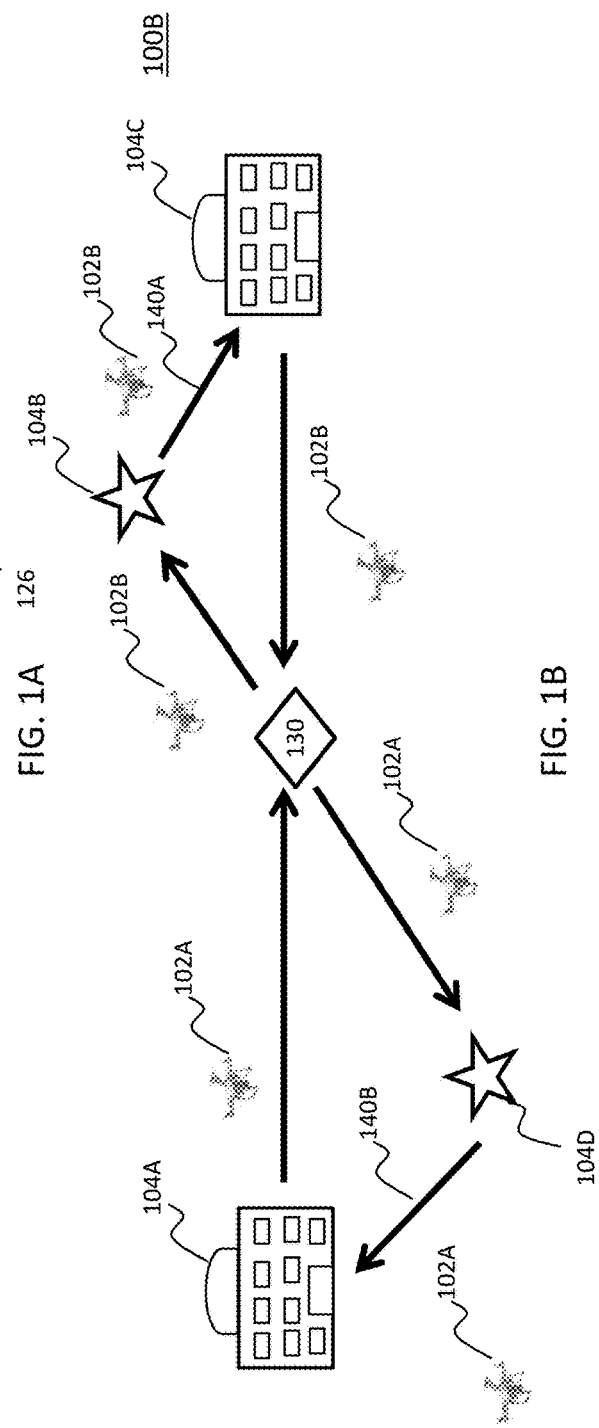

US 10,170,006 B2

ROUTE PLANNING FOR MULTI-UNMANNED AERIAL VEHICLE-BASED PACKAGE DELIVERY

BACKGROUND

The present disclosure relates generally to package transport services, and more specifically, to route planning for multi-unmanned aerial vehicle-based package delivery.

Unmanned aerial vehicles (UAVs), sometimes referred to as drones, are used for a variety of means such as surveying remote and/or expansive areas, e.g., power lines, pipelines, and wetlands.

More recently, the prospect of utilizing UAVs in a commercial setting has been explored. The ability to transport goods to consumers by UAVs offers great value, e.g., in terms of reducing traffic congestion associated with ground transport vehicles, as well as providing the ability to obtain access to areas in which delivery vehicles are limited (e.g., mountainous terrain, remote camping locations, crowded beaches, etc.).

SUMMARY

Embodiments include a method, system, and computer program product for route planning for multi UAV-based package delivery. A method includes receiving, at a computer processor, data for each of a plurality of unmanned aerial vehicles (UAVs). The data includes a UAV identifier, current geographic location, and final destination of each UAV. The method also includes calculating permutations of travel routes for each of the UAVs. The proposed travel routes are calculated as a function of the current location of each of the plurality of UAVs and final destinations of each of the plurality of UAVs. The method also includes applying a selected variable to the calculated permutations to produce proposed travel routes for the plurality of UAVs, and generating a routing plan from the proposed travel routes.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1A depicts a scenario of a routing scheme for UAVs;

FIG. 1B depicts a scenario of a routing scheme for UAVs by UAV route planning services in accordance with an embodiment;

DETAILED DESCRIPTION

Figure 2:
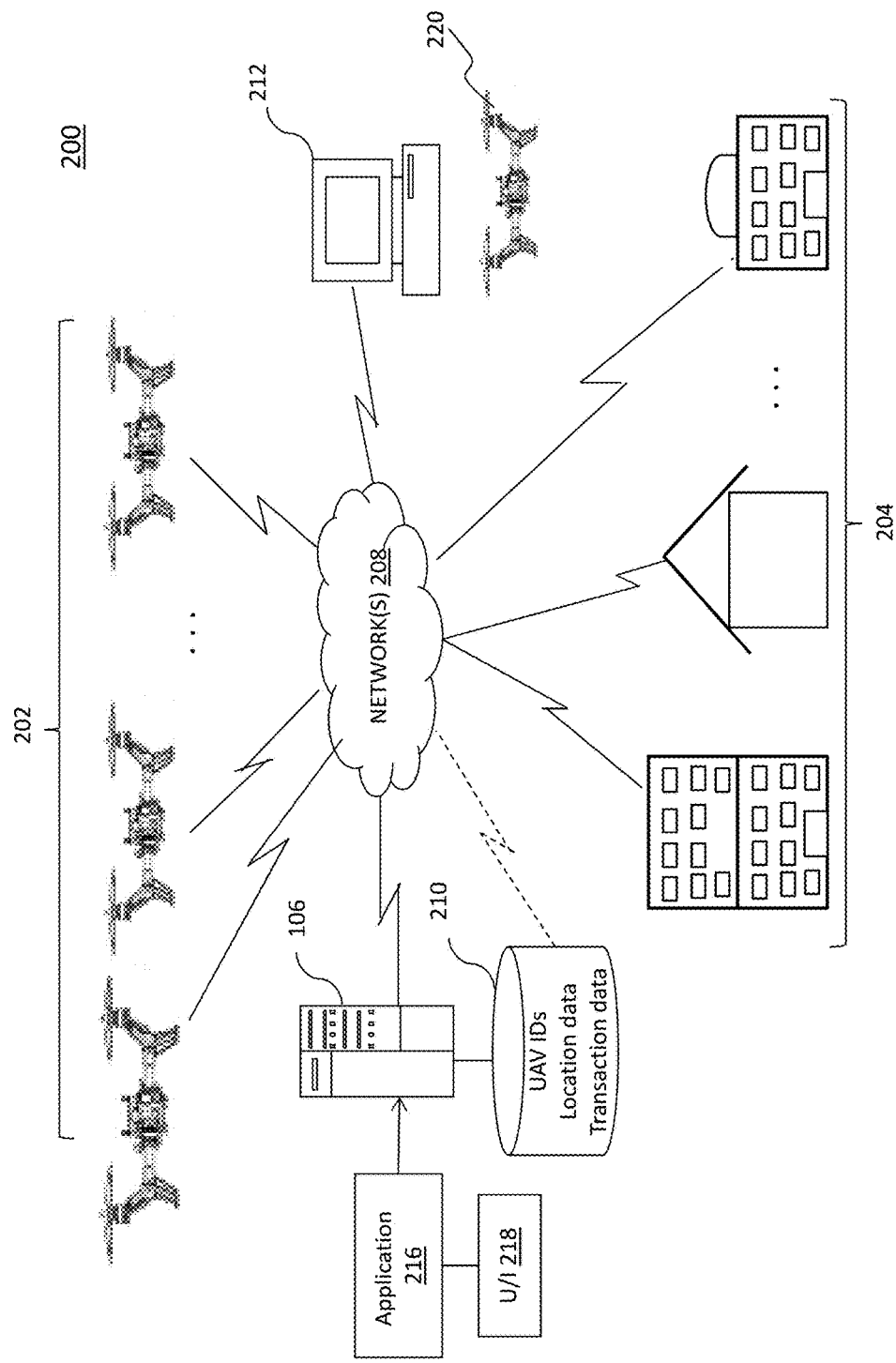
FIG. 2 depicts a block diagram of a system upon which route planning services may be implemented in accordance with an embodiment.

Embodiments described herein can be utilized for unmanned aerial vehicle (UAV)-implemented package transport services. The route planning services enable optimized route planning for a UAV network that minimizes idle time associated with transporting packages between locations. In addition, the optimized routing plan may factor in other criteria, such as UAV power consumption (e.g., power reserve), minimized delivery times, perishability of cargo, and/or commitment of a delivery time frame. The route planning services enable dynamic reconfiguration of a routing scheme for the network of UAVs based on various factors (e.g., delays caused by weather, mechanical failures, or other elements) that alter the prescribed routes. In addition, the exemplary route planning services enable out-of-network UAVs to be part of the routing configuration planning. These and other features of the route planning services will now be described.

Turning now to FIGS. 1A and 1B, two routing scenarios 100A and 100B will now be described. The routing scenario 100A illustrates a routing plan prior to optimization, while the routing scenario 100B illustrates a routing plan after optimization using the route planning services described herein. FIGS. 1A and 1B include two UAVs 102A and 102B. A UAV refers to an unmanned aircraft whose flight is, e.g., autonomously controlled through onboard computer systems. In an embodiment, a portion of the flight control may be implemented remotely through interaction with a ground station (not shown) or other remote device. The UAVs 102A and 102B include physical components and related circuitry configured to pick up, carry, and drop off packages. In an embodiment, the UAVs 102A and 102B may be part of a carrier network, e.g., an organization that offers package delivery services to others. In another embodiment, the UAVs 102A and 102B may span multiple carrier networks, e.g., two or more organizations that offer package delivery services.

In FIG. 1A, UAV 102A is en route 120 from an origination point 104A to deliver a package to a final destination point 104B. Once the UAV 102A drops a package off at its final destination point 104B, it travels along route 122 (absent its package) to a return location (e.g., the origination point 104A). This return route 122 represents idle time in that the UAV 102A is not actively engaged in a package delivery or pick-up service. Likewise, a second UAV 102B begins its route 124 at a location 104C that is proximately near the destination point 104B of UAV 102A. Once the package is delivered to a destination point 104D, which is destination point 104D is proximately near the origination point 104A of UAV 102A, the UAV 102B returns along a route 126 to its origination point 104C. The return route 126 of UAV 102B represents idle time. As shown in FIG. 1A, there is considerable idle time (represented as routes 122 and 126) associated with the routing scenario implemented for the UAVs 102A and 102B.

In an embodiment, the optimized route planning services receive various data that is used to identify routing schemes that not only minimize idle time, but can also provide optimization for other desired variables, such as those identified above. In FIG. 1B, a simplified scenario of an optimized routing scheme 100B for a network of two UAVs is shown. The routing scheme 100B shown in FIG. 1B is based on minimized idle time of UAVs. In the optimized routing scheme 100B, a first package (not shown) is picked up from location 104A by UAV 102A and is scheduled for delivery to destination point 104B, while a second package (not shown) picked up from location 104C by UAV 102B is scheduled for delivery to destination point 104D. In the optimized routing scheme 100B, the UAVs 102A and 102B deliver their packages to an interchange point 130, which is located at some point between the origination locations 104A and 104C and destination locations 104B and 104D. The UAVs 102A and 102B exchange their packages with each other at the interchange point 130. The UAV 102A carries the second package to its destination point 104D and returns to its origination location 104A along route 140B. The route 140B represents the idle time for the UAV 102A for this routing scheme 100B. Likewise, UAV 102B carries the first package to its destination point 104B and returns to its origination location 104C along route 140A. The route 140A represents the idle time for the UAV 102B for this routing scheme 100B. As shown in FIG. 1B, the idle time for the routes 140A and 104B is much less than the idle time shown for the routes 122 and 126 of FIG. 1A.

Referring now to FIG. 2, a high level view of a system 200 for implementing route planning services is generally shown in accordance with an embodiment. The system 200 includes a plurality of unmanned aerial vehicles (UAVs) 202 and a plurality of pick-up and drop-off locations 204, each of which is communicatively coupled to one or more networks 208. The UAVs 202 refer to the UAVs 102A and 102B of FIGS. 1A and 1B. In addition, the pick-up and drop-off locations 204 refer to the origination and destination points 104A-104D, respectively.

The pick-up and drop off locations 204 may include origination locations, intermediate locations along a route, and final destination locations. An origination location, e.g., may be a place of business associated with a seller of goods or associated warehouse. An origination location is also referred to as a package pick-up location. A final destination location may be a consumer's dwelling or place of business. The final destination refers to the final destination for a package, e.g., after any intermediate stops. Intermediate locations may include points of interchange in which UAVs exchange packages based on an optimized routing schedule. Intermediate locations may include any fixed location (e.g., a rooftop) or may be an in-flight point of transfer. In an embodiment, other locations 204 may include a resting point or storage location for a UAV that is awaiting delivery instructions or has just completed all package deliveries for a given schedule. Other locations 204 may also include a power recharging station or a Federal Aviation Administration (FAA) weigh station.

The networks 208 may be any type of known networks including, but not limited to, a wide area network (WAN), a local area network (LAN), a global network (e.g. Internet), a virtual private network (VPN), and an intranet. The networks 208 may be implemented using wireless networks or any kind of physical network implementation known in the art, e.g., using cellular, satellite, and/or terrestrial network technologies. The networks 208 may also include short range wireless networks utilizing, e.g., BLUETOOTH™ and WI-FI™ technologies and protocols. In one embodiment, the UAVs 202 communicate with the other UAVs 202 over a short-range wireless network when in range with one another. The UAVs 202 may communicate with other network entities, such as a host system computer 206 over a long-range network (e.g., satellite or cellular).

The system 200 also includes the host system computer 206, and a personal computer 212, each of which is communicatively coupled to one or more of the networks 208. The host system computer 206 may be implemented as one or more high-speed computer processing devices, such as one or more mainframe computers capable of handling a high volume of activities conducted on behalf of end users of the route planning services. The host system computer 206 implements an application 216 to centrally manage the route planning services described herein.

In one embodiment, the host system computer 206 may be implemented by an entity that sells goods to consumers. Alternatively, the host system computer 206 may be implemented by a third-party service provider that provides route planning services as an intermediary between the seller entity and the consumers.

The personal computer 212 may be implemented as a general-purpose desktop or laptop computer. An end user consumer may access a user interface 218 of the host system computer 206 via a web browser operating on the computer 212. In an embodiment in which the host system computer 206 is a seller of goods, the end user may order goods from the host system computer 206, as well as schedule delivery of the goods, as will be described further herein.

A storage device 210 is coupled to the host system computer 206 and may be alternatively coupled to the host system computer 206 via one or more of the network(s) 208. The storage device 210 stores a variety of data used by the host system computer 206 in implementing the route planning services described herein. As shown in FIG. 2, the storage device 210 stores UAV identifiers for UAVs in a network, location information for the UAVs, and final destination data for products or packages on board the UAVs. Other information may include transaction data corresponding to the packages, payment information, and other data. It is understood that the storage device 210 may be implemented using memory contained in the host system computer 206 or may be a separate physical device. The storage device 210 is logically addressable as a consolidated data source across a distributed environment that includes the networks 208.

The host system computer 206 operates as a database server and coordinates access to application data including data stored in the storage device 210. The host system computer 206 may be implemented using one or more servers operating in response to a computer program stored in a storage medium accessible by the server. The host system computer 206 may operate as a network server (e.g., a web server) to communicate with the personal computer 212 and other network entities.

In an embodiment, the application 216 may be configured to receive user inputted routing variables (e.g., via the user interface 218 functions) and/or UAV-specific data directly from one or more UAVs, which are used by the application 216 to identify proposed routing plans that are optimized for the desired variables. The application 216 receives data about in-network UAVs as well as out-of-network UAVs, including UAV identifiers that uniquely identify the UAVs, package delivery information, such as pick-up and drop-off locations, as well as delivery commitment data (e.g., where a consumer orders a package with expedited shipping). The application 216 may also receive a plethora of other data, such as power requirements for a package delivery by a UAV, current power reserve (e.g., available power reserve of a UAV at a particular point in time), perishability information associated with cargo, and current location information of the UAVs). The application 216 may be configured to calculate permutations of the possible travel routes based at least in part on pick-up locations and destination locations. In an embodiment, these permutations account for pathways, such as streets, highways, 'as the crow flies,' as well as logistical and safety requirements, such as the avoidance of tall buildings, power lines, cell towers, and populated areas).

One or more variables can be applied to these permutations to facilitate selection of an optimized route. For example, if package delivery time is the selected variable for optimization, the process evaluates all potential paths with respect to delivery times and the options are ordered with respect to delivery time and the best single choice is selected or the top two or three are presented for further analysis or evaluation.

Figure 3:
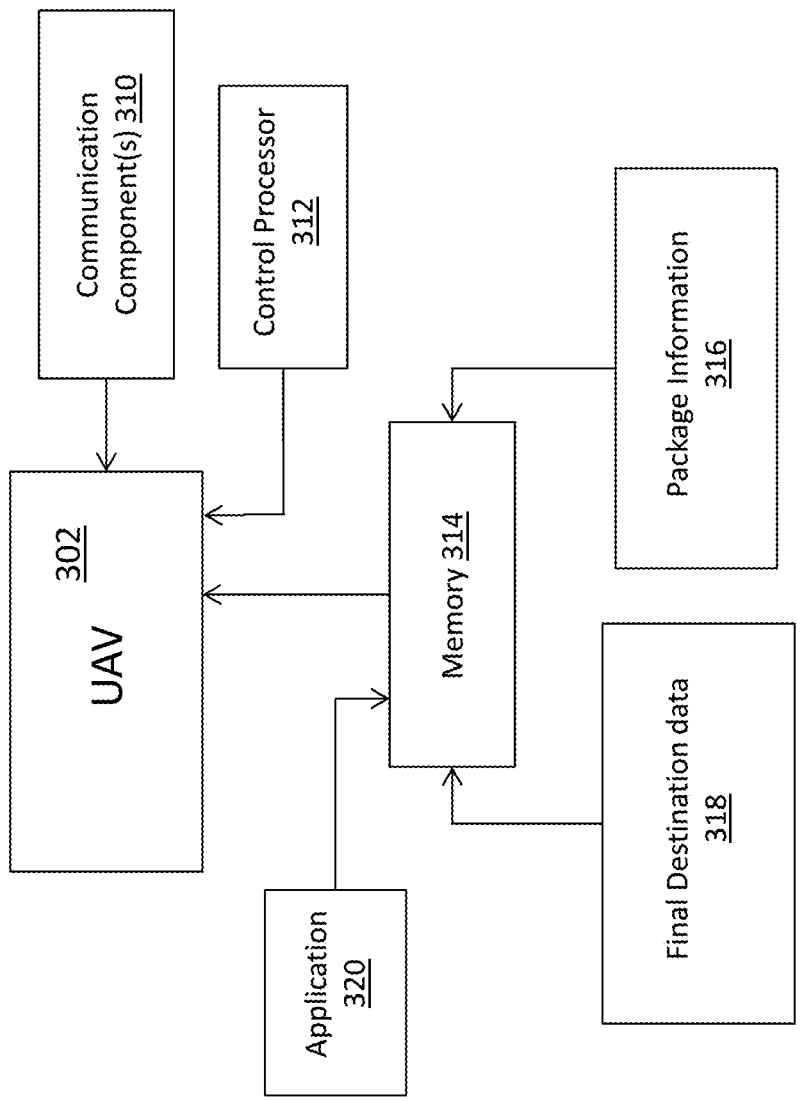
FIG. 3 depicts a block diagram of UAV components in accordance with an embodiment.

Turning now to FIG. 3, a UAV 302 will now be described in an embodiment. The UAV 302 refers to the UAVs 102A and 102B of FIGS. 1A and 1B, as well as the UAVs 202 described in FIG. 2. The UAV 302 includes communication components 310, a control processor 312, and memory 314. The memory 314 stores package information 316 for packages on board the UAV, final destination data 318 for each of the packages, and an application 320. The application 320 is executable by the control processor 312 to coordinate the functions of the UAV 302 as described herein. The control processor 312 is communicatively coupled to the circuitry of the UAV 302 to receive operational data from components of the UAV 302, such as data indicating the in-flight status and landing information associated with a drop off point or final destination. In an embodiment, while not explicitly shown, the UAV 302 may also include a scanner device (e.g., bar code reader) that may be integrated into the UAV for identifying the pick-up and transportation of the correct packages (e.g., against a manifest).

The communication components 310 include an antenna configured to receive communications from the host system computer 206 over one or more networks (e.g., networks 208). The communications may include instructions associated with a package delivery operation. The package delivery operation refers to the pickup and transport of a package to a destination as defined by GPS coordinates (and vertical scale information that provides altitude data corresponding to the delivery point) The instructions include the GPS coordinates, vertical scale data, and the identifier of a UAV subject to a package exchange operation. The instructions may also include a security key, or authentication data for validating a UAV subject to package exchange, as described further herein.

The communications enabled by the antenna include communications from the UAV 302 to the host system computer 206. For example, upon completing a package transfer operation, the UAV 302 may send associated information to the host system computer 206, which is stored in the storage device 210 as a transaction record.

The communications components 310 also include an antenna configured to send short-range wireless communications to another UAV 302. In an embodiment, when the UAV 302 reaches its drop-off location defined by the GPS coordinates (e.g., interchange point 130), it may send a communication to discover the presence of the UAV that is picking up the package. Once the UAV 302 has discovered the presence of the receiving UAV, the UAV 302 requests the device identifier of the receiving UAV. The device identifier received from the receiving UAV is compared against the device identifier, e.g., in the instructions received from the host system computer 206 to ensure that the package is delivered to the UAV.

As indicated above, the route planning services are managed by the host system computer 206. In an embodiment, an end user of the services may access a website of the host system computer 206 and is presented with an interface for initiating an order for goods offered by an entity associated with the host system computer 206. Alternatively, the host system computer 206, as a transport package services provider and not a seller, may interface with a seller on behalf of the user to acquire package information. In an embodiment, e.g., when a consumer is in a location in which package delivery services by UAVs are not available, the user may schedule a pick up operation using a personal UAV.

In placing an order, the user provides an identifier of the personal UAV, which is referred herein as an out-of-network UAV (e.g., UAV 220). Once the order has been placed, the route planning services include providing order details to a designated UAV for implementing a package delivery.

Figure 4:
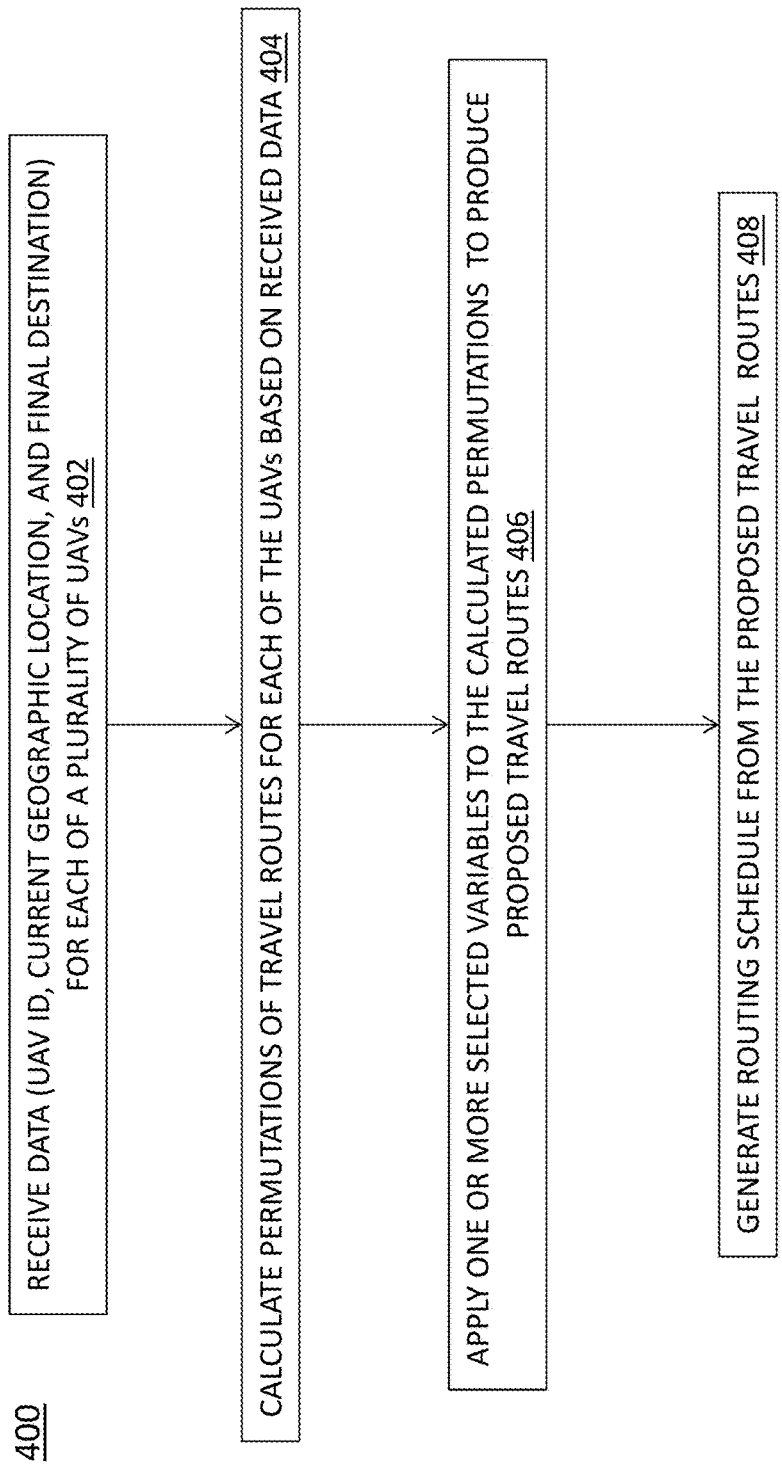
FIG. 4 depicts a flow diagram for implementing route planning services in accordance with an embodiment.

Turning now to FIG. 4, a flow diagram of a process 400 for implementing the route planning services will now be described in an embodiment. In block 402, the host system computer 206 receives data for each of a plurality UAVs, both in network and out-of-network. The data includes a UAV identifier, current geographic location, and final destination of each package on board the UAV. As indicated above, the data may also include other data, such as UAV power requirements, UAV power reserve, package perishability information, delivery commitment data, etc.

In block 404, permutations of all possible travel routes for each of the UAVs are calculated from the data received in block 402. In block 406, one or more variables are applied to the permutations to produce proposed travel routes. In an embodiment, the application 216 factors in interchange points 130 as intermediate locations in which UAVs can exchange or transfer packages (e.g., to minimize idle time), as well as an opportunity to recharge if power reserves are low.

In block 408, an optimized routing plan is generated from the proposed travel routes. For example, if multiple permutations each offer some advantage in terms of minimized idle time or other applied variable, a single routing plan can be selected based on user choice. In an embodiment, the processes may calculate, with respect to the variables, a total, sum, and/or average. For example, an average could be incorporated from some set of conditions (e.g., time frame, UAV type, weather conditions, etc.).

In an embodiment, the process includes transmitting instructions to the plurality of UAVs (e.g., from the host system computer 206 to one or more UAVs 202), which convey routing information corresponding to the selected routes, and each of the electronic instructions is addressed to a corresponding UAV based on the UAV identifier.

In an embodiment, the process includes monitoring deployment data associated with the plurality of UAV, periodically receiving current location data from the plurality of UAVs, and dynamically reconfiguring the selected travel routes based on an increase or decrease in the estimated aggregate idle time, or other unforeseen variables such as weather, UAV mechanical issues, etc. In this embodiment, the processes 400 described in FIG. 4 can be repeated whereby the data received is modified to reflect an identified issue. For example, if a UAV experiences mechanical failure, the data applied by the host system computer 206 to the calculations may not include that UAV identifier of the affected UAV. If weather is a concern in a certain region, then the data applied by the host system computer 206 may not include routes corresponding to that region . . . .

As indicated above, the network of UAVs may include more than one carrier. In this embodiment, the data received at the host system computer 206 may include a carrier identifier, such that different carriers can be distinguished from one another. The carrier identifier may be used in part as one of the variables applied to the permutations as indicated above.

Also, as indicated above, one or more of the UAVs may be out-of-network UAVs. In an embodiment, the host system computer 206 may receive a mode of pick up request from a user of the out of network UAV. The mode of pick up indicates the consumer's own UAV. In this embodiment, the host system computer may receive an identifier of the out-of-network UAV, and upon determining a package subject to a transaction by the user of the out of network UAV is available for delivery, the host system computer 206 transmits a schedule delivery message to the user, which includes a package drop off location and date. A routing message is transmitted to one of the in-network UAVs, which may include the identifier of the out-of-network UAV and the drop off location.

Authentication data may be transmitted to the in-network UAV. The authentication data is configured to validate the out-of-network UAV prior to hand off of the package. The authentication process may include a positive identification of the out-of-network UAV and approval of the package transfer. Approval may include a verification step that checks to make sure the cargo contains the correct package or items. In an embodiment, the host system computer 206 may receive a message from the in-network UAV responsive to successful validation by the out-of-network UAV that the package meets product specifications. The message may be conveyed from the out-of-network UAV to the in-network UAV.

Technical effects and benefits include route planning services that enable optimized route planning for a UAV network that minimizes idle time associated with transporting packages between locations. The route planning services enable dynamic reconfiguration of a routing scheme for the network of UAVs based on various factors (e.g., delays caused by weather, mechanical failures, or other elements) that alter the prescribed routes. In addition, the exemplary route planning services enable out-of-network UAVs to be part of the routing configuration planning.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving, at a computer processor, data for each of a plurality of unmanned aerial vehicles (UAVs), the data including a UAV identifier, current geographic location, and final destination of each UAV;
   calculating a plurality of permutations of travel routes for each of the UAVs, the proposed travel routes calculated as a function of the current geographic location of each of the plurality of UAVs and the final destinations of the plurality of UAVs;
   applying a selected variable to the plurality of calculated permutations to produce proposed travel routes for the plurality of UAVs, wherein the selected variable is configured to minimize an idle time for the plurality of UAVs, wherein the idle time is time that each of the plurality of UAVs are not actively engaged in a package delivery or pick-up service; and
   generating a routing plan from the proposed travel routes, wherein at least one of the proposed travel routes includes an interchange location at which a first UAV of the plurality of UAVs exchanges a package with a second UAV of the plurality of UAVs.

2. The method of claim 1, further comprising transmitting instructions to the plurality of UAVs, the instructions conveying routing information corresponding to the routing plan, wherein each of the instructions is addressed to a corresponding UAV based on the UAV identifier.

3. The method of claim 1, further comprising:
   monitoring deployment data associated with the plurality of UAVs;
   periodically receiving current location data from the plurality of UAVs; and
   dynamically reconfiguring the routing plan based on an increase or decrease in an estimated aggregate idle time.

4. The method of claim 1, wherein the plurality of UAVs spans multiple network carriers, and the data includes a carrier identifier.

5. The method of claim 1, wherein at least one of the plurality of UAVs is out of network with respect to others of the plurality of UAVs, the others of the plurality of UAVs comprising in-network UAVs, the method further comprising:
   receiving a mode of pick up request from a user of the out of network UAV;
   receiving an identifier of the out of network UAV;
   upon determining a package subject to a transaction by the user of the out of network UAV is available for delivery:
   transmitting a schedule delivery message to the user, the schedule delivery message including a package drop off location and date; and
   transmitting a routing message to one of the in-network UAVs, the routing message including the identifier of the out of network UAV and the drop off location.

6. The method of claim 5, further comprising:
   transmitting authentication data to the in-network UAV, the authentication data configured to validate the out-of-network UAV prior to hand off of the package.

7. The method of claim 1, wherein the interchange locations include at least one of a rooftop and in-flight transfer location.

8. The method of claim 1, wherein the variable is at least one of minimized idle time, package delivery commitment time, perishability of the package, and available power reserve of a UAV.

9. A system, comprising:
   a memory having computer readable instructions; and
   a processing unit for executing the computer readable instructions, the computer readable instructions including:
   receiving data for each of a plurality of unmanned aerial vehicles (UAVs), the data including a UAV identifier, current geographic location, and final destination of each UAV;
   calculating a plurality of permutations of travel routes for each of the UAVs, the proposed travel routes calculated as a function of the current geographic location of each of the plurality of UAVs and the final destinations of the plurality of UAVs;

applying a selected variable to the plurality of calculated permutations to produce proposed travel routes for the plurality of UAVs, wherein the selected variable is configured to minimize an idle time for the plurality of UAVs, wherein the idle time is time that each of the plurality of UAVs are not actively engaged in a package delivery or pick-up service; and generating a routing plan from the proposed travel routes, wherein at least one of the proposed travel routes includes an interchange location at which a first UAV of the plurality of UAVs exchanges a package with a second UAV of the plurality of UAVs.

10. The system of claim 9, wherein the computer readable instructions further comprise transmitting instructions to the plurality of UAVs, the instructions conveying routing information corresponding to the routing plan, wherein each of the electronic instructions is addressed to a corresponding UAV based on the UAV identifier.

11. The system of claim 9, wherein the computer readable instructions further comprise:

monitoring deployment data associated with the plurality of UAVs;

periodically receiving current location data from the plurality of UAVs; and dynamically reconfiguring the routing plan based on an increase or decrease in an estimated aggregate idle time.

12. The system of claim 9, wherein the plurality of UAVs spans multiple network carriers, and the data includes a carrier identifier.

13. The system of claim 9, wherein at least one of the plurality of UAVs is out of network with respect to others of the plurality of UAVs, the others of the plurality of UAVs comprising in-network UAVs, the computer readable instructions further comprising:

receiving a mode of pick up request from a user of the out of network UAV;

receiving an identifier of the out of network UAV;

upon determining a package subject to a transaction by the user of the out of network UAV is available for delivery:

transmitting a schedule delivery message to the user, the schedule delivery message including a package drop off location and date; and transmitting a routing message to one of the in-network UAVs, the routing message including the identifier of the out of network UAV and the drop off location.

14. The system of claim 13, wherein the computer readable instructions further comprise:

transmitting authentication data to the in-network UAV, the authentication data configured to validate the out-of-network UAV prior to hand off of the package.

15. A computer program product comprising a computer readable storage medium having program instructions embodied therewith, wherein the computer readable storage medium is not a transitory signal per se, the program instructions executable by a computer processor to cause the computer processor to perform a method comprising:

receiving data for each of a plurality of unmanned aerial vehicles (UAVs), the data including a UAV identifier, current geographic location, and final destination of each UAV;

calculating a plurality of permutations of travel routes for each of the UAVs, the proposed travel routes calculated as a function of the current geographic location of each of the plurality of UAVs and the final destinations of the plurality of UAVs;

applying a selected variable to the calculated a-plurality of permutations to produce proposed travel routes for the plurality of UAVs, wherein the selected variable is configured to minimize an idle time for the plurality of UAVs, wherein the idle time is time that each of the plurality of UAVs are not actively engaged in a package delivery or pick-up service; and generating a routing plan from the proposed travel routes, wherein at least one of the proposed travel routes includes an interchange location at which a first UAV of the plurality of UAVs exchanges a package with a second UAV of the plurality of UAVs.

16. The computer program product of claim 15, wherein the program instructions further comprise transmitting instructions to the plurality of UAVs, the instructions conveying routing information corresponding to the routing plan, wherein each of the electronic instructions is addressed to a corresponding UAV based on the UAV identifier.

* * * * *